April 7, 1942.   F. L. FULLER   2,278,983
VARIABLE SPEED TRANSMISSION DEVICE
Filed Nov. 5, 1940   3 Sheets-Sheet 1
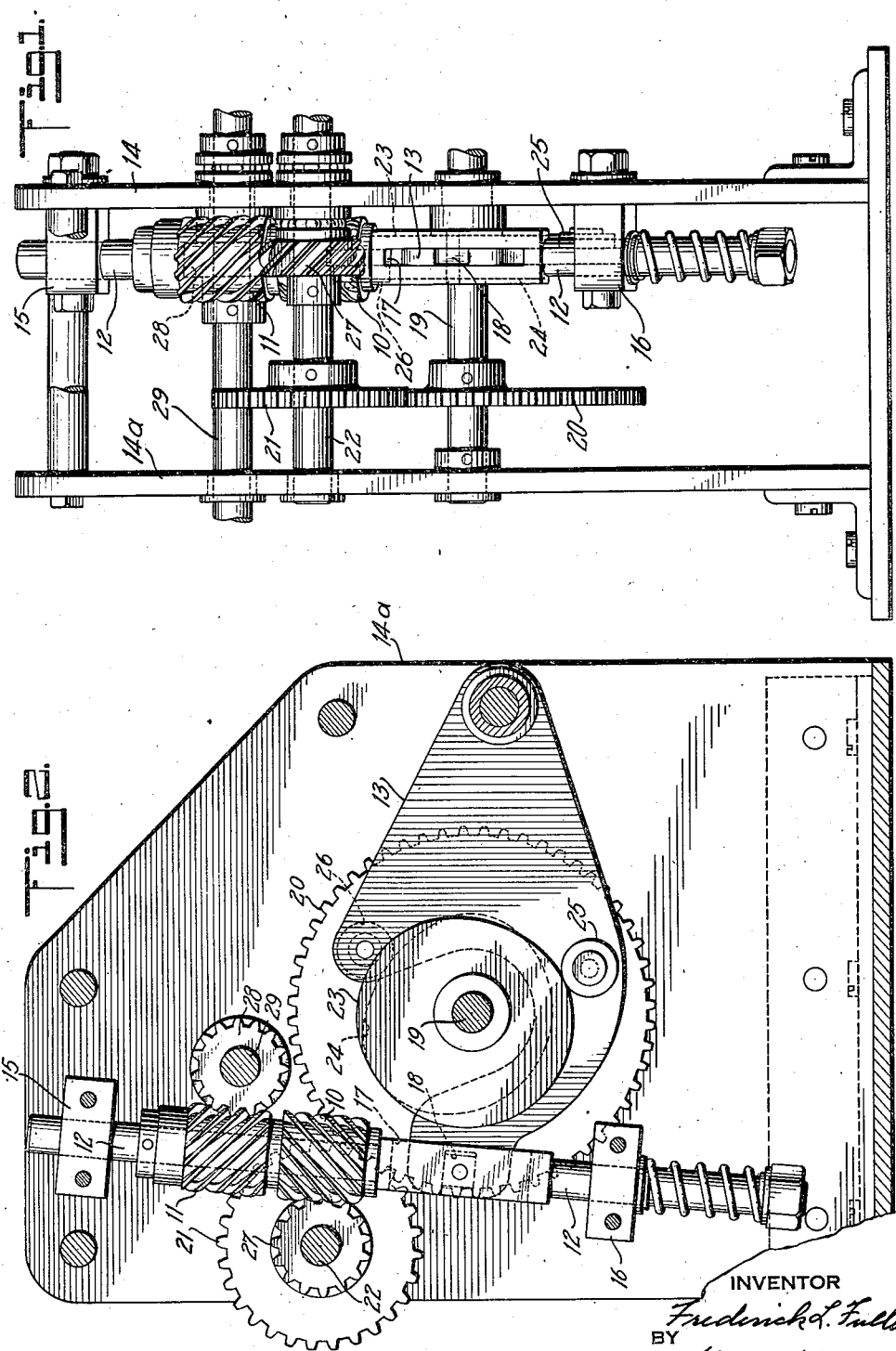
INVENTOR
Frederick L. Fuller
BY
ATTORNEY

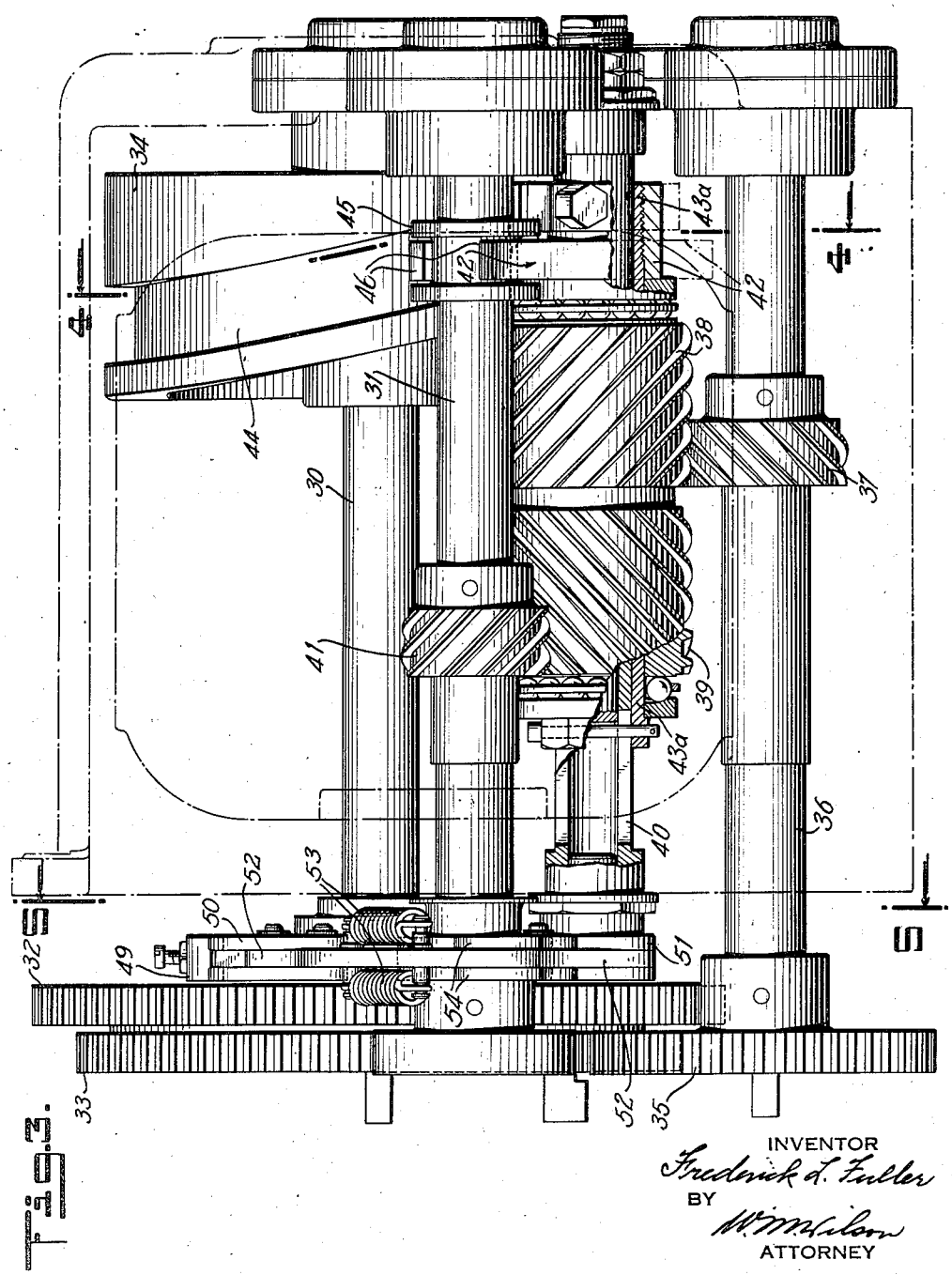

April 7, 1942.   F. L. FULLER   2,278,983
VARIABLE SPEED TRANSMISSION DEVICE
Filed Nov. 5, 1940   3 Sheets-Sheet 3
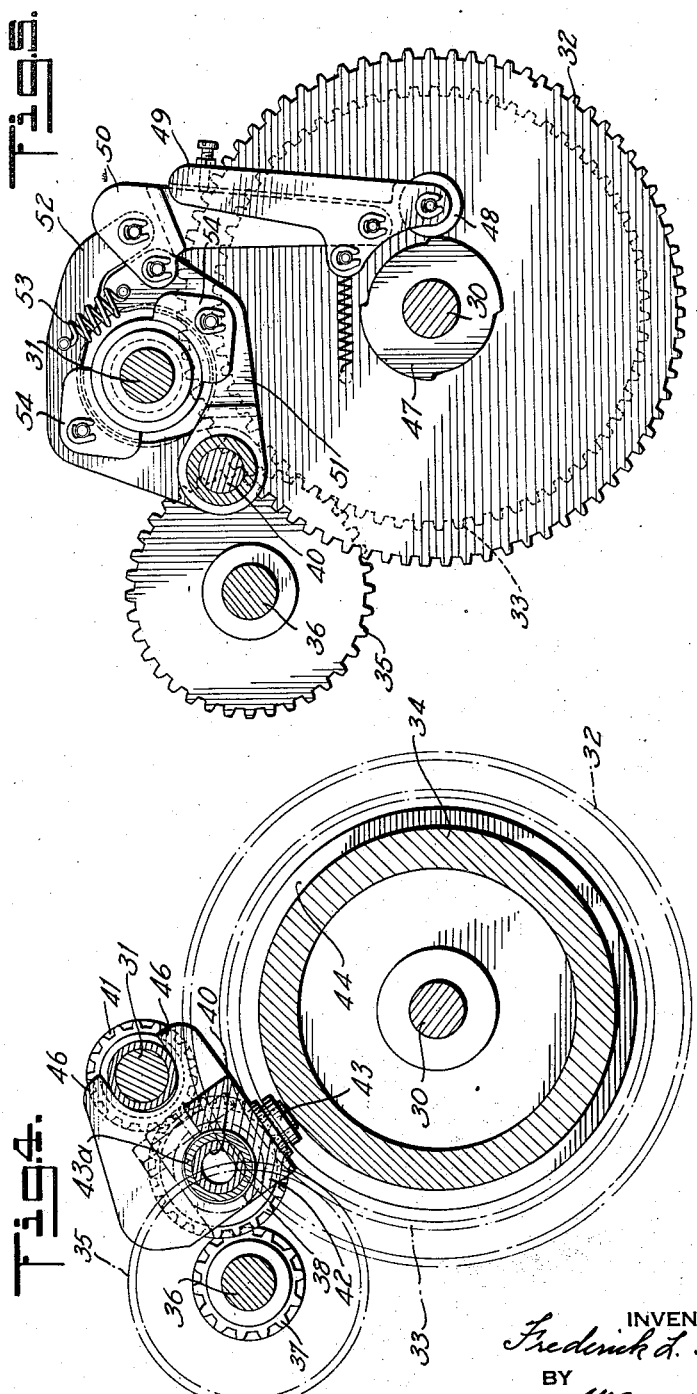
INVENTOR
Frederick L. Fuller
BY
ATTORNEY Patented Apr. 7, 1942

2,278,983

UNITED STATES PATENT OFFICE 2,278,983

VARIABLE SPEED TRANSMISSION DEVICE

Frederick L. Fuller, West Orange, N. J., assignor to International Business Machines Corporation, New York, N. Y., a corporation of New York Application November 5, 1940, Serial No. 364,386

5 Claims. (Cl. 74—393)

This invention relates to variable speed transmission devices, and particularly to such devices whereby variable transmission speeds are obtained by employing intermediate driving means which are capable of being actuated in two directions simultaneously.

An object of the present invention resides in the provision of gearing means interposed between the driving and driven members, which gearing means have different movements imparted thereto simultaneously, for controlling variably the movement of the driven means.

To this end, spiral gearing means are provided which are carried by an axially movable shaft, so that the said gearing means can be rotated at variable speeds, and also be displaced axially, at the same time, for controlling the operation of the driven member. Suitable control means, such as a cam and follower arm, are provided for actuating the spiral gearing means axially, which control means are under the control of, or rotated by, the driving member.

Another object of the invention resides in the provision of spiral gearing means, the operation of which is controlled by the driving member, for controlling the variable operation of the driven member in accordance with the speed of rotation and degree of axial movement thereof.

Another object of the invention resides in the provision of means, under control of the driving means for controlling the degree of axial movement imparted to the said spiral gearing means.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a front elevation view of the device.

Fig. 2 is a side view, partially in section of the device shown in Fig. 1.

Fig. 3 is a front elevation view, partially in section, of a modification of the device.

Fig. 4 is a sectional view along lines 4—4 of Fig. 3.

Fig. 5 is a sectional view along lines 5—5 of Fig. 3.

Referring now to Figs. 1 and 2, the device is shown to comprise spiral gearing means interposed between the driving member and driven member, said means consisting of the spiral gears 10 and 11. The said gears are fixed to each other, and preferably are formed integrally as shown, and in turn are mounted rotatably on the shaft 12. The said shaft is adapted to be positioned axially by the cam follower arm 13 which is pivotally mounted on a side frame 14. Guide members 15 and 16 for the movable shaft 12 are provided and are affixed to the side frame 14. The free end of the follower arm 13 is bifurcated and fitted into a slot 17 formed in the shaft 12, to engage the stud member 18 which is fixedly positioned in the slot. The stud member can be formed as an integral part of the shaft 12, or can be an insertable member which is suitably fixed or pinned to the shaft.

The driving member comprises the shaft 19 loosely mounted in the side frames 14 and 14a, and the gear 20 which is secured to the said shaft, and in mesh with an intermediate gear 21 secured to shaft 22, the latter also being loosely mounted in the said side frames. The shaft 19 has affixed thereto a set of complementary cams 23 and 24 which cooperate with the rollers 25 and 26 respectively, carried by the pivoted follower arm 13.

In view of the description up to this point, it is seen that, upon rotation of the shaft 19, by any suitable means, the said cams 23 and 24 are rotated to position or oscillate the cam follower arm 13 about its pivot, so that in turn the shaft 12, carrying the spiral gears 10 and 11 is positioned axially or reciprocated. It is evident that the degree of axial movement of the said shaft is dependent upon the configurations of the cams 23 and 24, and it is obvious that the degree of axial movement can be adjusted or selected to any desired extent by varying the said cam configurations accordingly.

In this manner one type of movement is imparted to the spiral gears 10 and 11. Another and different type of movement is imparted to the said gears by means of the gear 27 which is secured to the shaft 22, and the described gearing designated by the reference characters 20 and 21. Upon rotation of shaft 19 and gear 20, shaft 22 and gear 27 are rotated to effect rotation of spiral gears 10 and 11. Meshing with the said gear 11 is gear 28, the latter being secured to the driven member, namely shaft 29, which is suitably journaled in the side frames 14 and 14a. Thus, it is seen that the driven shaft 29 is rotated directly by the spiral gear 11.

In practice, the device described has been found to permit greater variations in the speeds of rotation of the driven shaft in shorter timed intervals than the prior art devices. For example, in statistical machines where space limitations are an important factor, it is necessary to effect a number of speed variations in succession in very brief timed intervals. It has been found that the present invention affords numerous advantages over the known devices of this type; in certain cases the successive speed ratios vary as much as 750% which must be effected in the fractions of a second. In this connection, it should be mentioned that shaft 19 is rotated at a constant speed, at all times, and from the description set forth, it is understood that shaft 22 is rotated at a constant speed, and that spiral gears 10 and 11 and shaft 29 are rotated at different speeds depending upon the axial displacement of shaft 12. For example, at the times, during the rotation of shaft 19 and cams 23 and 24, the follower arm 13 is so positioned that shaft 12 moves upwardly at a predetermined rate, as viewed in Fig. 1, the speed of rotation of the spiral gears 10 and 11 is reduced so that shaft 29 is rotated at a reduced speed; and at such times when the shaft 12 is positioned downwardly at a predetermined rate of speeds of rotation of gears 10 and 11, the shaft 29 are increased. It is evident that the decreased and increased speeds of rotation are dependent upon the rate of axial movement imparted to shaft 12, which in turn is under control of the said cams 23 and 24.

It is understood now, that that the spiral gearing means, namely gears 10 and 11, are actuated in two directions simultaneously, and in addition thereto, are actuated at varying rates in each of the two directions simultaneously. The varying rate of axial displacement of shaft 12 depends upon the configurations of the cams 23 and 24, and the varying rate of rotation of gears 10 and 11 depends upon the rate and direction of movement of the shaft 12. Without the use of spiral gearing means interposed between the driving and driven members, as described, the varying speeds of rotation of gears 10 and 11 could not be obtained, and consequently the greater and more abrupt changes in speed transmission afforded by the described device could not be effected in the short timed interval desired.

An additional feature of the described arrangement is the fact that the operation of the gearing described is reversible, that is, shaft 29 described as the driven member can be used as the driving shaft, and shaft 19 then becomes the driven member. Under these conditions, obviously the changes in speed transmissions are in a reverse sequence as compared to the changes in speed transmissions when shaft 19 is employed as the driving member.

Referring now to Figs. 3, 4, and 5, a modification of the described device is shown. In this embodiment of the different shafts carrying the various control elements are arranged in a parallel relationship. The driving and driven members or shafts are indicated by the reference characters 30 and 31, respectively. Secured at one end of the shaft 30 are the gears 32 and 33, and secured to the other end of the said shaft is the cam member 34. Gear 32 can be rotated by any suitable cooperating driving means. Gear 33 meshes with gear 35, the latter being pinned to shaft 36 which carries gear 37. The spiral gearing means in this modification comprises the spiral gears 38 and 39 which are integrally formed, and are keyed to shaft 40 for rotation therewith. The said shafts 30, 31, 36, and 40 are suitably journaled in side frames which are shown in dotted outline. The spiral gear 38 meshes with said gear 37, and spiral gear 39 meshes with gear 41 which is secured to the output shaft 31.

The axial movement of gears 38 and 39 is controlled by a cam follower 42 which is fixed to a sleeve member 43a, the latter being secured to or formed as an integral part of the spiral gearing means. The said cam follower 42 is provided with a suitable extension member 43 adapted to cooperate with the groove 44 formed in the cam member 34. A suitable support and guide collar 45 for the cam follower is loosely mounted on shaft 31. It is seen that the said follower 42 is shaped so that the arcuate extensions 46 partially surround the dwelled section of collar 45.

The operation of the described modification is as follows: Upon rotation of gears 32, 33 and shaft 30, gear 37 is set in motion by means of gear 35 and shaft 36. The spiral gears 38 and 39 are driven by gear 37 to drive gear 41 and shaft 31. Cam member 34 is also rotated by shaft 30 to displace the cam follower 42 and spiral gears 38 and 39 axially in accordance with the configuration of cam groove 44. The axial movement of the spiral gearing means controls the variations in the speed of rotation of gear 41 and shaft 31 precisely as described hereinabove.

Due to the great variations in rotative speeds of the output shaft 31 in very brief intervals which are effected by the described device, a suitable braking mechanism can be provided to operate on the output shaft, and thereby assist in the regulation of the rotative speeds of this shaft. Excessive wear of the cooperating parts can be reduced by employing such a brake mechanism due to the inertia of the moving parts, particularly when the device is operated at excessive speeds, and abnormal and abrupt changes in rotative speeds are effected.

The operation of the brake mechanism, at such timed intervals, when it is desired to decrease abruptly the rotative speed of shaft 31, is controlled by cam element 47. A roller 48, rotatably supported by a spring urged follower arm 49, is adapted to cooperate with the said cam element. The follower arm is pivotally supported by arm 50 which in turn is loosely connected to the ends of arcuately shaped arms 51 and 52 which normally are urged to a contracted condition by means of spring 53. The arms 51 and 52 are pivotally mounted on shaft 40, and as shown each arm carries a loosely supported shoe 54, which shoes are arranged to engage a hub 55 carried on one end of the shaft 31. The arms 51 and 52 are shown to be expanded by virtue of the action of arm 50 thereupon, which arm is urged to the right as viewed in Fig. 5, due to the engagement of the raised portion of cam element 47 with the roller 48 carried by arm 49. The configuration of the cam element is designed so that the action of the cam and controlled brake mechanism is effected in synchronism with the action of cam 34 and the controlled spiral gearing means, that is, when the spiral gearing means is positioned axially at such a rate so as to effect an abrupt decrease in the speed of rotation of shaft 31, the configuration of the cam element is such that the lower portions of the cam element engage the roller 48 and permit the brake mechanism to be effective to act upon shaft 31. When the raised portions of the cam element urge the arms 49 and 50 to the right (Fig. 5) to expand the arms 51 and 52, the brake shoes 54 are released, which release is effected at such times when it is desired to accelerate the speed of rotation of shaft 31.

While there has been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A variable speed transmission device comprising a rotatable driving member and a driven member, an axially displaceable shaft, spiral gearing means, rotatably mounted on said shaft, actuated by the driving member, upon rotation thereof, for controlling the operation of said driven member, a cam element actuated by the said driving member, and cam follower means controlled by said cam element for controlling the axial displacement of said shaft and spiral gearing means, thereby controlling the rate of operation of the said driven member.

2. A variable speed transmission device comprising a rotatable driving member and a driven member, axially displaceable spiral gearing means comprising a pair of directly coupled spiral gears, one of said spiral gears being actuated by the driving member upon rotation thereof, the other spiral gear being effective to operate the said driven member, a cam element actuated by the said driving member, and means controlled by said cam element for controlling the axial displacement of said spiral gearing means, thereby controlling the rate of operation of the said driven member.

3. A variable speed transmission device comprising a rotatable driving member and a driven member, axially displaceable spiral gearing means comprising a pair of directly coupled spiral gears, one of said spiral gears being actuated by the driving member, upon rotation thereof, the other spiral gear being effective to operate the said driven member, means actuated by one of said members, and means controlled by the said last mentioned means for controlling the axial displacement of said spiral gearing means, thereby controlling the rate of operation of the said driven member.

4. A variable speed transmission device comprising a rotatable driving member and a driven member, gearing elements comprising a pair of directly coupled spiral gears, one of said spiral gears being actuated by the driving member, upon rotation thereof, the other spiral gear being effective to operate the said driven member, and means under control of one of said members for imparting to said gearing elements different movements simultaneously, at varying rates, thereby controlling, at variable rates, the operation of said driven member.

5. A variable speed transmission comprising a rotatable driving member and a driven member, gearing elements actuated by the driving member, upon rotation thereof, for controlling the operation of said driven member, means under control of one of said members for imparting to said gearing elements different movements simultaneously, at varying rates, thereby controlling, at variable rates, the operation of said driven member, braking mechanism cooperating with said driven member, and means operating in synchronism with said imparting means for controlling the operations of said braking mechanism when the driven member is operated at predetermined rates.

FREDERICK L. FULLER.